US012676152B2

(12) United States Patent
Anand et al.

(10) Patent No.: US 12,676,152 B2
(45) Date of Patent: Jul. 7, 2026

(54) SYSTEMS AND METHODS FOR STRUCTURED COMMUNICATION OPTIMIZATION

(71) Applicant: JPMORGAN CHASE BANK, N.A., New York, NY (US)

(72) Inventors: Manoj Samuel Anand, Glasgow (GB); Elvir Azanli, Union, NJ (US); Omari Hitson, Columbus, OH (US); Joseph W. Ligman, Weston, CT (US); Pranav Deshpande, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 160 days.

(21) Appl. No.: 18/806,857

(22) Filed: Aug. 16, 2024

(65) Prior Publication Data

US 2026/0051320 A1 Feb. 19, 2026

(51) Int. Cl.
G10L 15/22 (2006.01)
G06N 20/00 (2019.01)
(Continued)

(52) U.S. Cl.
CPC .............. G10L 15/22 (2013.01); G06N 20/00 (2019.01); G06T 13/40 (2013.01); G06V 20/47 (2022.01); G10L 13/08 (2013.01); G10L 15/26 (2013.01)

(58) Field of Classification Search
CPC ......... G10L 15/26; G10L 15/22; G10L 13/08; G06N 20/00; G06T 13/40; G06V 20/47
See application file for complete search history.

(56) References Cited

U.S. PATENT DOCUMENTS

| | | | | |
|---|---|---|---|---|
| 10,586,369 B1 * | 3/2020 | Roche | .................. | G06T 13/205 |
| 11,087,521 B1 * | 8/2021 | Lombardi | .............. | G06T 13/40 |

(Continued)

FOREIGN PATENT DOCUMENTS

| | | | | |
|---|---|---|---|---|
| CN | 117893718 B * | 6/2024 | ............ | G10L 25/51 |
| EP | 4632742 A2 * | 10/2025 | ............ | G10L 13/10 |

(Continued)

OTHER PUBLICATIONS

Taheri, et al; "Enhancing Presentation Skills: A Virtual Reality-Based Simulator with Integrated Generative AI for Dynamic Pitch Presentations and Interviews", Lecture Notes in Computer Science, Nov. 9, 2024.

*Primary Examiner* — Mohammad K Islam
(74) *Attorney, Agent, or Firm* — GREENBERG TRAURIG LLP

(57) ABSTRACT

Systems and methods for structured communication optimization are disclosed. In one embodiment, a method may include: (1) receiving, by a computer program, parameters for a presentation from a presenter; (2) generating, by the computer program, an environment and an audience comprising one or more digital avatar based on the parameters; (3) displaying, by the computer program, the environment and one or more digital avatars on an electronic device; (4) receiving, by the computer program, audio and video from the presenter; (5) generating, by the computer program, real-time feedback for the presenter based on the audio and video; (6) generating, by the computer program, animations for the one or more digital avatar based on the real-time feedback; and (7) generating, by the computer program, a summary review of the presentation based on the audio and video received from the presenter during the presentation.

18 Claims, 3 Drawing Sheets

(51) Int. Cl.
   *G06T 13/40*     (2011.01)
   *G06V 20/40*     (2022.01)
   *G10L 13/08*     (2013.01)
   *G10L 15/26*     (2006.01)

(56)           References Cited

U.S. PATENT DOCUMENTS 11,935,170  B1 *   3/2024   Jain ........................ G06V 40/28
  2015/0381937  A1 *  12/2015   Adibowo .............. H04N 7/157
                                                             345/473
  2022/0141266  A1     5/2022   Cossar et al.
  2023/0080660  A1 *   3/2023   Miletic ................. G10L 15/063
                                                             382/103
  2023/0326445  A1 *  10/2023   Adam .................. G06N 3/0464
                                                             704/260
  2025/0013827  A1 *   1/2025   Chu ..................... G06F 40/284
  2025/0022200  A1 *   1/2025   Huang .................. G10L 13/047

FOREIGN PATENT DOCUMENTS

KR        20240116337  A  *   7/2024   ........... G06F 40/247
KR        20250046017  A  *   4/2025   ........... G06T 13/205
KR          102819882  B1 *   6/2025   ......... G06F 16/3329
WO         2024228830           11/2024

* cited by examiner

SYSTEMS AND METHODS FOR STRUCTURED COMMUNICATION OPTIMIZATION

BACKGROUND OF THE INVENTION

1. Field of the Invention

Embodiments generally relate to systems and methods for structured communication optimization.

2. Description of the Related Art

Fear of public speaking, or glossophobia, can impact an average employee's chances of getting promoted by 15% and their pay by 10%. According to Forbes, 70% of employees believe they need to improve their public speaking skills. This is easier said than done, as it is difficult to find a live audience to practice in front of.

SUMMARY OF THE INVENTION

Systems and methods for structured communication optimization are disclosed. In one embodiment, a method may include: (1) receiving, by a computer program, parameters for a presentation from a presenter; (2) generating, by the computer program, an environment and an audience comprising one or more digital avatar based on the parameters; (3) displaying, by the computer program, the environment and one or more digital avatars on an electronic device; (4) receiving, by the computer program, audio and video from the presenter; (5) generating, by the computer program, real-time feedback for the presenter based on the audio and video; (6) generating, by the computer program, animations for the one or more digital avatar based on the real-time feedback; and (7) generating, by the computer program, a summary review of the presentation based on the audio and video received from the presenter during the presentation.

In one embodiment, the parameters comprise a type of presentation, a type of audience, and an audience experience level, wherein the type of presentation may include a one-on-one presentation, a small group presentation, and a large group presentation, wherein the type of audience may include an audience of colleagues or an audience of management.

In one embodiment, the electronic device may include a holographic display, an augmented reality or virtual reality headset, or a computer.

In one embodiment, the step of generating real-time feedback for the presenter based on the audio and video may include: providing, by the computer program, the audio and video to a machine learning engine, wherein the machine learning engine may be trained with training data provided by subject matter experts; and receiving, by the computer program, the real-time feedback from the machine learning engine.

In one embodiment, the step of generating real-time feedback for the presenter based on the audio and video may include: converting, by the computer program, the audio to text; prompting, by the computer program, a large language model to analyze the text; and generating, by the computer program, the real-time feedback based on the analysis.

In one embodiment, the method may also include: converting, by the computer program, the audio to text; prompting, by the computer program, a large language model to generate a question based on the text; converting, by the computer program, the question to speech; and outputting, by the computer program, the speech to the presenter.

In one embodiment, the computer program animates one of the digital avatars to ask the question.

In one embodiment, the method may also include: receiving, by the computer program, responsive audio to the speech; converting, by the computer program, the responsive audio to responsive text; and prompting, by the computer program, the large language model to rate the responsive text.

According to another embodiment, a system may include an electronic device comprising a computer processor executing a computer program; and a display device. The computer program receives parameters for a presentation from a presenter, generates an environment and an audience comprising one or more digital avatar based on the parameters, causes the environment and one or more digital avatars to be displayed on the display device, receives audio and video from the presenter, generates real-time feedback for the presenter based on the audio and video, generates animations for the one or more digital avatar based on the real-time feedback, and generates a summary review of the presentation based on the audio and video received from the presenter during the presentation; and the display device displays the digital avatars and the animation.

In one embodiment, the parameters comprise a type of presentation, a type of audience, and an audience experience level, wherein the type of presentation may include a one-on-one presentation, a small group presentation, and a large group presentation, and the type of audience may include an audience of colleagues or an audience of management.

In one embodiment, the electronic device may include a holographic display, an augmented reality or virtual reality headset, or a computer.

In one embodiment, the computer program generates the real-time feedback for the presenter based on the audio and video by providing the audio and video to a machine learning engine, wherein the machine learning engine may be trained with training data provided by subject matter experts, and by receiving the real-time feedback from the machine learning engine.

In one embodiment, the computer program generates the real-time feedback for the presenter based on the audio and video by prompting a large language model to analyze the text, and by generating the real-time feedback based on the analysis.

In one embodiment, the computer program converts the audio to text, prompts a large language model to generate a question based on the text, converts the question to speech, and outputs the speech to the presenter.

In one embodiment, the computer program animates one of the digital avatars to ask the question.

In one embodiment, the computer program receives responsive audio to the speech, converts the responsive audio to responsive text, and prompts the large language model to rate the responsive text.

According to another embodiment, a non-transitory computer readable storage medium may include instructions stored thereon, which when read and executed by one or more computer processors, cause the one or more computer processors to perform steps comprising: receiving parameters for a presentation from a presenter wherein the parameters comprise a type of presentation, a type of audience, and an audience experience level, wherein the type of presentation may include a one-on-one presentation, a small group presentation, and a large group presentation, wherein the type of audience may include an audience of colleagues or an audience of management; generating an environment and an audience comprising one or more digital avatar based on the parameters; displaying the environment and one or more digital avatars on an electronic device, wherein the electronic device may include a holographic display, an augmented reality or virtual reality headset, or a computer; receiving audio and video from the presenter; generating real-time feedback for the presenter based on the audio and video; generating animations for the one or more digital avatar based on the real-time feedback; and generating a summary review of the presentation based on the audio and video received from the presenter during the presentation.

In one embodiment, when read and executed by the one or more computer processors, the instructions for generating real-time feedback for the presenter based on the audio and video cause the computer processor to provide the audio and video to a machine learning engine that may be trained with training data provided by subject matter experts; and to receive the real-time feedback from the machine learning engine.

In one embodiment, when read and executed by the one or more computer processors, the instructions for generating real-time feedback for the presenter based on the audio and video cause the computer processor to convert the audio to text, to prompt a large language model to analyze the text, and to generate the real-time feedback based on the analysis.

In one embodiment, the non-transitory computer readable storage medium may also include instructions stored thereon, which when read and executed by the one or more computer processors, cause the one or more computer processors to perform steps comprising: converting the audio to text; prompting a large language model to generate a question based on the text; converting the question to speech; outputting the speech to the presenter by animating one of the digital avatars to ask the question; receiving responsive audio to the speech; converting the responsive audio to responsive text; and prompting the large language model to rate the responsive text.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for structured communication optimization.

Embodiments may provide a digital service that will give presenters a platform to present their presentation while providing real time feedback and a detailed report/analysis at the end.

In one embodiment, the presenter may use a device that will present back to them a video or a likeness of themselves (like a mirror). The device may provide interactive feedback that will help the presenter improve various aspects of the speech like their posture, cadence, pronunciation, intonation, avoiding filler words and phrases, etc.

In embodiments, the service may be supported by a cohesive set of peripherals and Application Programming Interfaces (APIs). For example, peripherals may include devices such as cameras, hologram displays, monitors, touch screens, microphones, biometric devices, etc. The APIs may include speech to text, text to speech, conversational artificial intelligence (AI) systems (e.g., chatbots, virtual agents, etc. that can use natural language to communicate with humans), vision AIs (e.g., services that are trained to recognize images/video, including images detection, face/gaze detectors, posture detectors, etc.), generative AIs, and virtual avatars.

The digital service may be implemented in various manners. For example, in embodiments, the digital service may operate on a computer (e.g., a workstation, desktop, laptop, notebook, tablet, etc.) that has a webcam and a microphone and executing a web application or a standard desktop application. In another embodiment, the digital service may operate on a holographic display. In still another embodiment, the digital service may operate on an augmented reality/virtual reality device.

Figure 1:
FIG. 1 depicts a system for structured communication optimization according to an embodiment.
Figure 1:
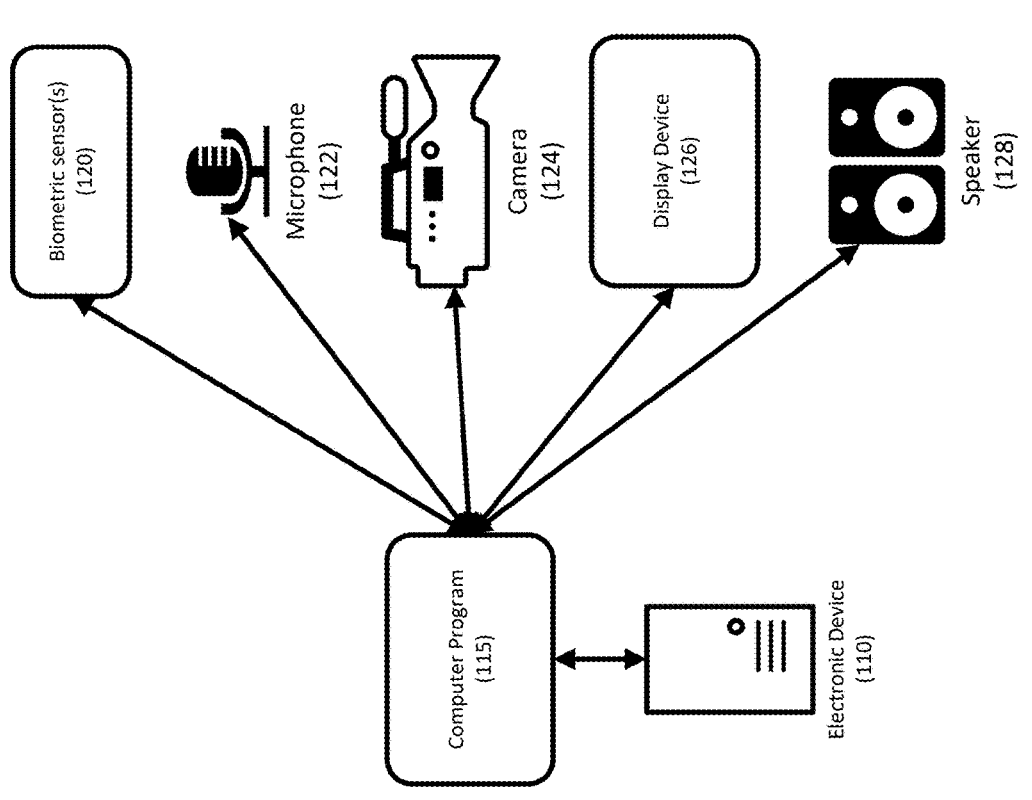

Referring to FIG. 1, a system for structured communication optimization is disclosed according to an embodiment. System 100 may include electronic device 110, such as a server (e.g., physical and/or cloud-based), a computer (e.g., workstation, desktop, laptop, notebook, tablet, etc.), a smart device (e.g., smartphone), an augmented reality (AR) or virtual reality (VR) headset, etc. Electronic device 110 may execute computer program 115, which may receive data from biometric sensor(s) 120, microphone 122 and camera 124, and may output data to display device 126 and speaker 128. In one embodiment, electronic device 110 may also include one or more of microphone 122, camera 124, display device 126, and speaker 128. In another embodiment, one or more of microphone 122, camera 124, display device 126, and speaker 128 may be presented as a separate device, such as a holographic display.

Biometric sensor(s) 120 may capture the presenter's biometrics (e.g., heart rate, breathing rate, etc.).

In one embodiment, microphone 122 and camera 124 may capture audio and video of the presenter giving a presentation, and feedback may be provided via display device 126 and/or speaker 128. In one embodiment, the feedback may be provided as text and/or audio; in another embodiment, feedback may be presented by a digital avatar via the digital avatar's expressions, interactions with the presenter, etc.

Computer program 115 may receive the audio and video of the presenter and may use a trained machine learning engine to provide feedback on the presentation. In one embodiment, the trained machine learning engine may be trained with information from subject matter experts (e.g., presentation experts, communications experts, etc.), and may include feedback on the presenter's posture, pronunciation, intonation, speech rate, hand gestures, and other statistics (e.g., pause or filler words, gaze avoidance, self-adaptive behaviors such as touching one's face, biometrics, etc.).

In one embodiment, a vision-language model (VLM) may be used to interpret and process visual information, gestures, etc., and a large language model (LLM) or multi-modal model may be used to interpret and process text and auditory information.

In one embodiment, computer program 115 may provide a simulated audience for the presenter with one or more digital avatars. The simulated audience may be provided in a variety of venues, including a small conference/seminar hall, a small meeting room, a one-on-one meeting, etc. The audience of digital avatars may include colleagues, support groups, managers, etc.

In one embodiment, the digital avatars may have different personalities (e.g., enthusiast, skeptic, expert, distractor, advocate, clarifier, etc.), and may ask questions verbally, by text, etc. For example, computer program 115 may receive text of the presentation (e.g., either before the presentation, or by transcribing the presentation in real-time) and may use a large language model to identify questions for the digital avatars to ask.

In one embodiment, computer program 115 may output a score to the presenter based on the presentation and may provide feedback on aspects that the presenter did well and aspects that need improvement.

In one embodiment, the presenter may also receive experience points by, for example, properly using hand gestures to keep the audience's attention, by speaking to a live audience, by practicing with computer program 115, by volunteering to be an audience member for another presenter, etc.

Computer program 115 may leverage artificial intelligence technologies, such as Large Language Models (LLM) to understand and generate human language. Other key components may include modules that help with speech-to-text, text-to-speech, pose estimation, pronunciation, language translation, etc.

For example, computer program 115 may take verbal speech received from microphone 122 and pass it thru a speech-to-text module that converts spoken language into written text. The text may then be sent to a LLM with a prompt, such as asking the LLM to summarize the text, and respond with a question, by making changes to generated content, etc. The text can then be passed to a text-to-speech service to convert the text to audio, which may be output via speaker 128.

Another example may be to prompt the LLM to count "pause" words, such as "ah," "um," etc. in the text. Based on this count, computer program 115 may provide feedback on the use of pause words.

Embodiments may further translate speech from one language to another.

In embodiments, computer program 115 may animate the digital avatar to represent different facial movements of the digital avatar when speaking. Embodiments may further provide pose estimation (e.g., provides tracking of human poses in real-time, a pause estimator (e.g., analyzes the audio signal to help detect pauses and other non-verbal cues), a speech analytic model (e.g., detection of keywords, such as "umm," sentiment, emotions, categorization, etc.), a speech rate model (e.g., detection of the speed of which a person speaks), a gaze estimation model (e.g., the task of predicting where a person is looking, given their whole face, which is similar to eye tracking, which directly tracks the pupil), an eye tracking model (e.g., tracking heart rate, breathing rate, etc.), etc.

Figure 2:
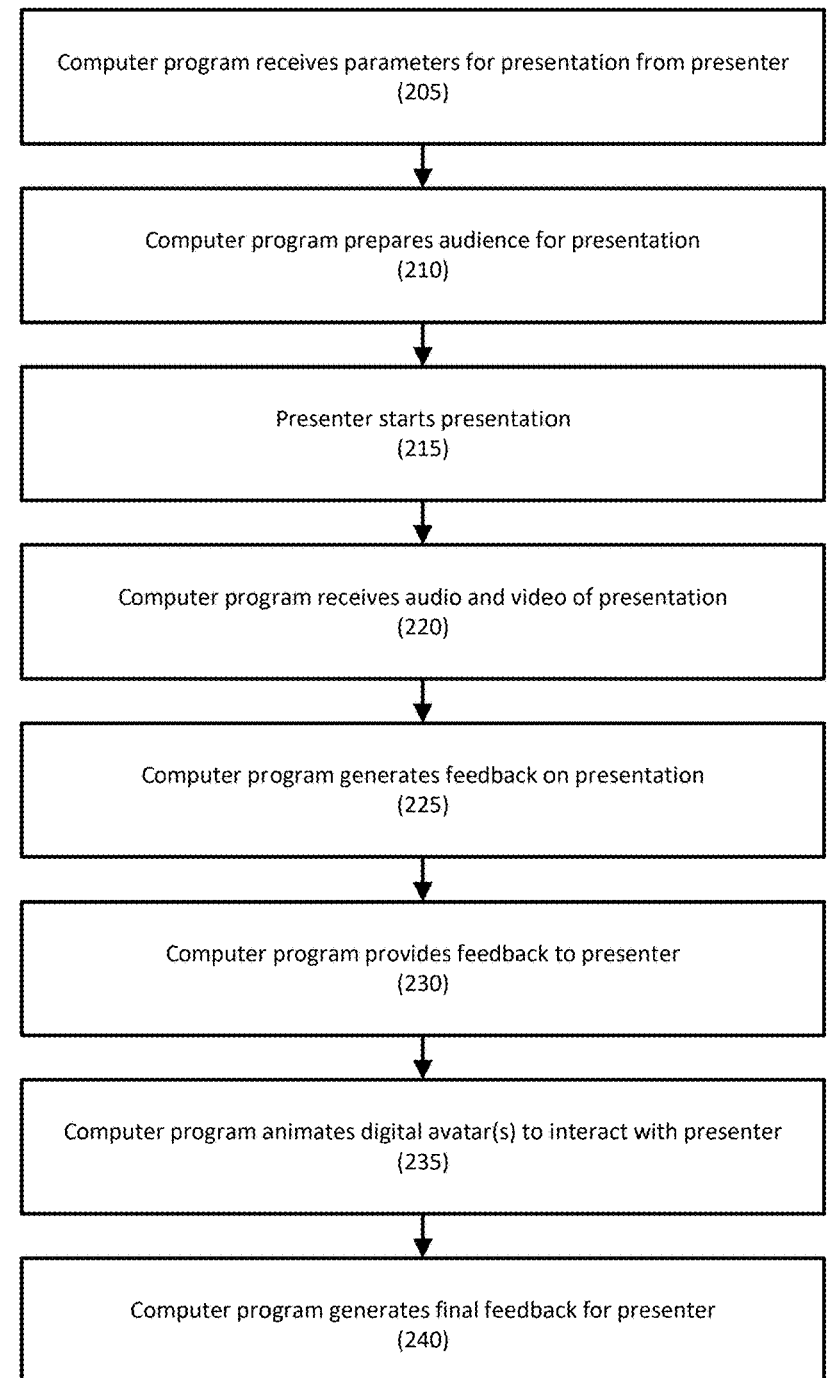
FIG. 2 depicts a method for structured communication optimization according to an embodiment.

Referring to FIG. 2, a method for structured communication optimization is disclosed according to an embodiment.

In step 205, a computer program may receive parameters for a presentation from a presenter. For example, the presenter may identify a type of presentation (e.g., one-on-one, small group, large group, etc.), a type of audience (e.g., colleagues, management, etc.), an audience experience level (e.g., the audience's experience with the subject matter of the presentation, the audience's ability to understand the presentation, the audience's level of skepticism, etc.), any specific digital avatars to have in the audience, etc. The presenter may also identify a purpose of the presentation (e.g., informative, persuasive, etc.). The presenter may also identify the device with which the presenter will interact, such as a holographic display, an AR/VR headset, a computer, etc.

In one embodiment, if resources need to be scheduled (e.g., for a holographic display), the presenter may also schedule the resources for use.

In addition, the presenter may upload text for the presentation, or may upload a summary. For example, the user may upload a presentation with slides seeking talking points.

In step 210, the computer program may generate the audience for the presentation. For example, the computer program may generate one or more digital avatars for the presentation, may prepare questions for the digital avatars using a LLM, etc. The computer program may also generate a virtual environment for the presentation, such as a conference room, small presentation hall, large presentation hall, etc.

The computer program may then display the environment and digital avatar(s) on an electronic device, such as a holographic display, an AR/VR headset, a computer, etc.

In step 215, the computer program may receive an instruction from the presenter to start the presentation. In one embodiment, the computer program may provide a virtual environment based on the parameters provided by the presenter.

In step 220, the computer program may receive audio and video of the presenter. The computer program may also receive biometrics, such as heart rate, pulse, temperature, breathing rate, etc. from the presenter.

In step 225, the computer program may provide the audio and video to a machine learning engine or LLM. For example, the trained machine learning engine may be trained with information from subject matter experts (e.g., presentation experts, communications experts, etc.), and may include feedback on the presenter's posture, pronunciation, intonation, speech rate, hand gestures, and other statistics (e.g., pause or filler words, gaze avoidance, self-adaptive behaviors such as touching one's face, biometrics, etc.). The machine learning engine or LLM may analyze the audio and/or video and may generate real-time feedback for the presenter.

In one embodiment, audio may be converted to text in order to analyze the contents, such as an analysis of words used, pause or filler words used, overall message, duration breakdown, etc.

For example, the computer program may provide the text of the presentation to the LLM with a prompt to return an analysis of the use of pause or filler words. As another example, the computer program may provide the text of the presentation to the LLM with a prompt to return the language level (e.g., sophistication of the language) for the presentation. Other prompts for other analysis of the text may be provided as is necessary and/or desired.

The LLM may return its analysis to the computer program, which may then be provided to the presenter as real-time feedback.

For certain analysis, such as volume level, pitch, cadence, intonation, etc. conversion to text may not be necessary. For example, the computer program may provide the audio to a multi-modal engine with a prompt for an analysis of the volume level, timing, pitch, cadence, intonation, or any other feature as is necessary and/or desired. The multi-modal engine may return its analysis to the computer program, which may then be provided to the presenter as real-time feedback.

Visual information, such as shoulder position, hand movements, head tilt, eye gauze, etc. may be received in the video. For example, the computer program may provide a VLM with video of the presentation with a prompt for posture, hand movements, eye gaze, engagement with the audience, etc. The VLM may return its analysis to the computer program, which may then be provided to the presenter as real-time feedback.

In embodiments, the computer program may compare the data from the audio and/or video feed to benchmark training data. For voice parameters, the comparison may evaluate confidence, clarity, friendliness, emotion, etc.

For posture, the comparison may evaluate confidence, comfort, etc.

For text, the comparison may evaluate filler word ratio, emotion, efficient usage of time, and delivery of the message.

In step 230, the computer program may provide the real-time feedback to the presenter, for example, via a digital avatar by altering the digital avatar's expressions, questions, etc., by displaying instructions for the presenter to slow down, to stop gestures, to be aware of the use of certain words, etc.

In embodiments, the computer program may provide the real-time feedback, such as the analysis of words used, pause or filler words used, volume level, pitch, cadence, intonation, posture, hand movements, head tilt, eye gauze, confidence, clarity, friendliness, emotion, etc.

In one embodiment, "real-time" feedback may refer to any feedback that is provided to the presenter during the course of the presentation.

In one embodiment, the real-time feedback provided during the presentation may be provided in a manner to not cause too much of a distraction to the presenter. For example, the real-time feedback may show and highlight certain positive and negative feedback, such as displaying an icon that shows the presenter's intonation, speech rate, etc. for a given moment.

In one embodiment, the real-time feedback may be provided in response to the presenter's audio, gestures, etc. It may be provided once a trend can be identified (e.g., after enough data is collected and processed to determine the presenter's cadence), in response to the presenter taking an action (e.g., once it can be identified that the presenter is slouching), etc. Trends, such as cadence, pitch, etc. may be provided for a period time, so that the presenter can understand and appreciate the trend (e.g., the cadence has decreased as the presentation proceeds).

Examples of real-time feedback are as follows: (1) a user is asked a question (e.g., audio or text) by a digital avatar based on the content presented. The user orally responds to the digital avatar. The real-time feedback may include the presenter's response time, the correctness or persuasiveness of technical details in response, the presenter's confidence (e.g., deduced by number of hesitation phrases, pitch, use of questions rather than statements); (2) the presenter's average cadence throughout oration (e.g., a pace of presentation may graphically be presented); (3) sending links to resources for improvement; (4) providing a feedback in relation to how peers performed; etc.

In one embodiment, the computer program may animate the audience of digital avatars may respond to presenter based on the presenter's performance. For example, if the presenter's speech rate is too slow, or speaks in a monotone voice, the digital avatars may be animated to look away from the presenter, check their watches, phones, alter their facial expressions, change their posture, etc. If the presenter is performing well, the digital avatars may be animated to look engaged, laugh, clap, etc.

If the presenter loses the audience in the middle of their presentation, the real-time feedback may include recommendation on how to win the audience back, such as by speaking up, adjusting tone, adjusting posture, etc.

Embodiments may also provide exercises, such as having the presenter speak with a book or object on his or her head, to improve posture.

Embodiments may also suggest edits to the presenter's content.

In step 235, the computer program may control and/or animate the digital avatars to interact with the presenter. For example, during the presentation, the computer program may generate questions and may animate the digital avatars to ask the presenter. The questions may be based on information provided with the parameters, based on real-time transcription of the presentation, etc. In one embodiment, the presenter may set the presentation to include a separate question and answer section where the digital avatars can ask questions.

In one embodiment, the computer program may prompt the LLM to generate a question for the digital avatar to ask based on the text of the presentation, based on a summary of the presentation, on something off-topic (e.g., to see how the presenter responds to something unexpected), etc. The computer program may convert the question to speech and may animate one of the digital avatars to ask the question while outputting the speech on a speaker.

The presenter's responsive audio to the question may be converted to text, and the computer program may provide the responsive text with the question to the LLM with a prompt to rate the presenter's response.

The presenter's non-oral response (e.g., the presenter's expressions, posture, time to respond, tone of response, etc. may also be provided to a LLM or a VLM for analysis.

The monitoring may continue throughout the duration of the presentation.

In step 240, when the presentation is complete, the computer program may generate a summary review of the presentation, which may identify things the presenter did well, things the presenter should include, how the presenter was perceived, etc. The summary review may provide the presenter with more specific details on the overall presentation. For example, the summary review may identify differences in speech rate, and may recommend that the presenter work on keeping a steady speech rate. It may identify the presenter's gaze and recommend that the presenter work on being more engaged with the audience.

The summary review may include the real-time feedback.

Figure 3:
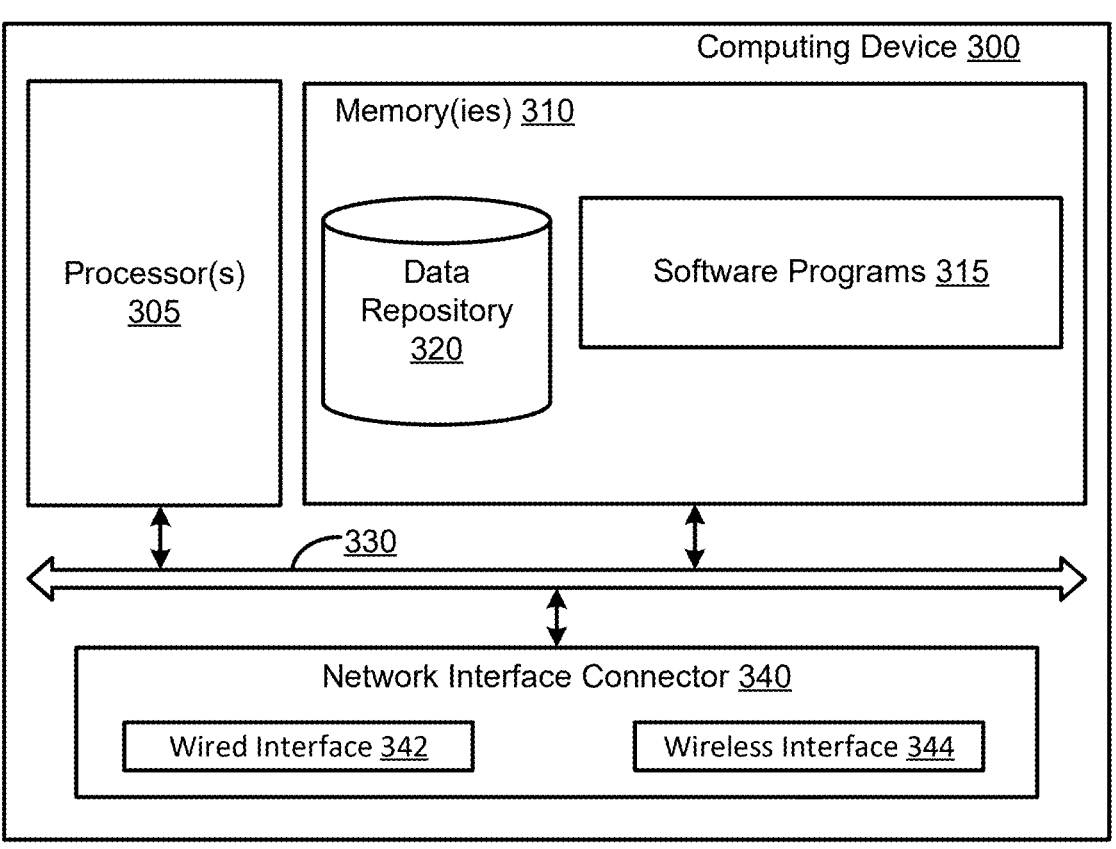
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330.

Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a computer program, parameters for a presentation from a presenter, wherein the parameters comprise a type of presentation, a type of audience, and an audience experience level, wherein the type of presentation comprises a one-on-one presentation, a small group presentation, and a large group presentation, wherein the type of audience comprises an audience of colleagues or an audience of management;

generating, by the computer program, an environment and an audience comprising one or more digital avatar based on the parameters;

displaying, by the computer program, the environment and one or more digital avatars on an electronic device;

receiving, by the computer program, audio and video from the presenter;

generating, by the computer program, real-time feedback for the presenter based on the audio and video;

generating, by the computer program, animations for the one or more digital avatar based on the real-time feedback; and generating, by the computer program, a summary review of the presentation based on the audio and video received from the presenter during the presentation.

2. The method of claim 1, wherein the electronic device comprises a holographic display, an augmented reality or virtual reality headset, or a computer.

3. The method of claim 1, wherein the step of generating real-time feedback for the presenter based on the audio and video comprises:

providing, by the computer program, the audio and video to a machine learning engine, wherein the machine learning engine is trained with training data provided by subject matter experts; and receiving, by the computer program, the real-time feedback from the machine learning engine.

4. The method of claim 1, wherein the step of generating real-time feedback for the presenter based on the audio and video comprises:

converting, by the computer program, the audio to text;

prompting, by the computer program, a large language model to analyze the text; and generating, by the computer program, the real-time feedback based on the analysis.

5. The method of claim 1, further comprising:

converting, by the computer program, the audio to text;

prompting, by the computer program, a large language model to generate a question based on the text;

converting, by the computer program, the question to speech; and outputting, by the computer program, the speech to the presenter.

6. The method of claim 5, wherein the computer program animates one of the digital avatars to ask the question.

7. The method of claim 5, further comprising:

receiving, by the computer program, responsive audio to the speech;

converting, by the computer program, the responsive audio to responsive text; and prompting, by the computer program, the large language model to rate the responsive text.

8. A system, comprising:

an electronic device comprising a computer processor executing a computer program; and a display device;

wherein the computer program receives parameters for a presentation from a presenter, wherein the parameters comprise a type of presentation, a type of audience, and an audience experience level, wherein the type of presentation comprises a one-on-one presentation, a small group presentation, and a large group presentation, wherein the type of audience comprises an audience of colleagues or an audience of management, generates an environment and an audience comprising one or more digital avatar based on the parameters, causes the environment and one or more digital avatars to be displayed on the display device, receives audio and video from the presenter, generates real-time feedback for the presenter based on the audio and video, generates animations for the one or more digital avatar based on the real-time feedback, and generates a summary review of the presentation based on the audio and video received from the presenter during the presentation; and the display device displays the digital avatars and the animation.

9. The system of claim 8, wherein the electronic device comprises a holographic display, an augmented reality or virtual reality headset, or a computer.

10. The system of claim 8, wherein the computer program generates the real-time feedback for the presenter based on the audio and video by providing the audio and video to a machine learning engine, wherein the machine learning engine is trained with training data provided by subject matter experts, and by receiving the real-time feedback from the machine learning engine.

11. The system of claim 8, wherein the computer program generates the real-time feedback for the presenter based on the audio and video by converting the audio to text, by prompting a large language model to analyze the text, and by generating the real-time feedback based on the analysis.

12. The system of claim 8, wherein the computer program converts the audio to text, prompts a large language model to generate a question based on the text, converts the question to speech, and outputs the speech to the presenter.

13. The system of claim 12, wherein the computer program animates one of the digital avatars to ask the question.

14. The system of claim 12, wherein the computer program receives responsive audio to the speech, converts the responsive audio to responsive text, and prompts the large language model to rate the responsive text.

15. A non-transitory computer readable storage medium, including instructions stored thereon, which when read and executed by one or more computer processors, cause the one or more computer processors to perform steps comprising:

receiving parameters for a presentation from a presenter wherein the parameters comprise a type of presentation, a type of audience, and an audience experience level, wherein the type of presentation comprises a one-on-one presentation, a small group presentation, and a large group presentation, wherein the type of audience comprises an audience of colleagues or an audience of management;

generating an environment and an audience comprising one or more digital avatar based on the parameters;

displaying the environment and one or more digital avatars on an electronic device, wherein the electronic device comprises a holographic display, an augmented reality or virtual reality headset, or a computer;

receiving audio and video from the presenter;

generating real-time feedback for the presenter based on the audio and video;

generating animations for the one or more digital avatar based on the real-time feedback; and generating a summary review of the presentation based on the audio and video received from the presenter during the presentation.

16. The non-transitory computer readable storage medium of claim 15, wherein when read and executed by the one or more computer processors, the instructions for generating real-time feedback for the presenter based on the audio and video cause the computer processor to provide the audio and video to a machine learning engine that is trained with training data provided by subject matter experts; and to receive the real-time feedback from the machine learning engine.

17. The non-transitory computer readable storage medium of claim 15, wherein when read and executed by the one or more computer processors, the instructions for generating real-time feedback for the presenter based on the audio and video cause the computer processor to convert the audio to text, to prompt a large language model to analyze the text, and to generate the real-time feedback based on the analysis.

18. The non-transitory computer readable storage medium of claim 15, further comprising instructions stored thereon, which when read and executed by the one or more computer processors, cause the one or more computer processors to perform steps comprising: converting the audio to text; prompting a large language model to generate a question based on the text; converting the question to speech; outputting the speech to the presenter by animating one of the digital avatars to ask the question; receiving responsive audio to the speech;

converting the responsive audio to responsive text; and prompting the large language model to rate the responsive text.

* * * * *